United States Patent
Chi et al.

(10) Patent No.: US 9,178,826 B2
(45) Date of Patent: Nov. 3, 2015

(54) METHOD AND APPARATUS FOR SCHEDULING COMMUNICATION TRAFFIC IN ATCA-BASED EQUIPMENT

(75) Inventors: Caixia Chi, Shanghai (CN); Fang Liu, Shanghai (CN); Qiang Liu, Shanghai (CN); Dong Yan, Shanghai (CN); Bin Wang, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 51 days.

(21) Appl. No.: 13/820,798

(22) PCT Filed: Aug. 24, 2011

(86) PCT No.: PCT/IB2011/002293
§ 371 (c)(1),
(2), (4) Date: Mar. 5, 2013

(87) PCT Pub. No.: WO2012/042360
PCT Pub. Date: Apr. 5, 2012

(65) Prior Publication Data
US 2013/0163420 A1 Jun. 27, 2013

(30) Foreign Application Priority Data

Sep. 28, 2010 (CN) .......................... 2010 1 0503247

(51) Int. Cl.
*H04L 12/26* (2006.01)
*H04L 12/803* (2013.01)
(Continued)

(52) U.S. Cl.
CPC ............ *H04L 47/125* (2013.01); *H04L 43/062* (2013.01); *H04L 43/067* (2013.01);
(Continued)

(58) Field of Classification Search
CPC .............. H04L 43/067; H04L 43/0835; H04L 43/0894; H04L 12/2626; H04L 2012/5678; H04L 2012/568; H04L 2012/5684; H04L 29/08144; H04L 47/125; H04L 29/08243

USPC ......... 370/230–235, 252, 328, 338, 412, 392; 709/223–241
See application file for complete search history.

(56) References Cited

U.S. PATENT DOCUMENTS

| 7,032,037 B2 | 4/2006 | Garnett et al. | |
| 2004/0260936 A1* | 12/2004 | Hiray et al. | 713/200 |

(Continued)

FOREIGN PATENT DOCUMENTS

| CN | 101682544 A | 3/2010 |
| CN | 101729413 A | 6/2010 |

(Continued)

OTHER PUBLICATIONS

International Search Report PCT/ISA/210 for PCT/IB2011/002293 dated Mar. 15, 2012.

(Continued)

*Primary Examiner* — Charles C Jiang
*Assistant Examiner* — Mohamed Kamara
(74) *Attorney, Agent, or Firm* — Harness, Dickey & Pierce, P.L.C.

(57) ABSTRACT

A method for scheduling communication traffic in an Advanced Telecom Computing Architecture based equipment and a corresponding apparatus are provided. In the method, communication traffic information of traffic processing means in the equipment is collected; based on the collected communication traffic information, a traffic distribution rule for the traffic processing means in next time period is generated; and based on the generated traffic distribution rule, incoming communication traffic of the equipment is scheduled. The method of the invention considers the quality of service and contracted capacity of the whole equipment and the dynamic processing capability and running environment of the traffic processing means, and can balance the loads of the respective traffic processing means in the equipment with asymmetric multi-application configuration well by adaptively adjusting the distribution of the communication traffic, to guarantee the quality of service of the whole equipment.

16 Claims, 6 Drawing Sheets

(51) Int. Cl.
*H04L 12/851* (2013.01)
*H04L 12/863* (2013.01)
*H04L 29/08* (2006.01)

(52) U.S. Cl.
CPC ........ *H04L43/0835* (2013.01); *H04L 43/0894* (2013.01); *H04L 47/24* (2013.01); *H04L 47/2425* (2013.01); *H04L 47/54* (2013.01); *H04L 67/10* (2013.01)

(56) References Cited

U.S. PATENT DOCUMENTS

| | | | |
|---|---|---|---|
| 2006/0120282 A1* | 6/2006 | Carlson et al. | 370/229 |
| 2006/0140119 A1* | 6/2006 | Yeh et al. | 370/235 |
| 2007/0058632 A1* | 3/2007 | Back et al. | 370/392 |
| 2009/0175168 A1* | 7/2009 | Wadekar et al. | 370/235 |
| 2009/0303892 A1* | 12/2009 | Yamasaki | 370/252 |
| 2009/0310491 A1* | 12/2009 | Ginsberg et al. | 370/241 |
| 2010/0135155 A1 | 6/2010 | Sankhavaram | |
| 2011/0116443 A1* | 5/2011 | Yu et al. | 370/328 |

FOREIGN PATENT DOCUMENTS

| | | |
|---|---|---|
| EP | 1 455 488 A1 | 9/2004 |
| JP | 2006041920 A | 2/2006 |
| JP | 2009175889 A | 8/2009 |
| JP | 2010093421 A | 4/2010 |
| JP | 2010124382 A | 6/2010 |
| WO | WO-2006071550 A2 | 7/2006 |

OTHER PUBLICATIONS

Office Action for Chinese Application No. 201010503247.7 dated May 27, 2014.
Japanese Notice of Rjection dated Sep. 16, 2014 for related Japanese Application No. 2013-530806 (full translation provided).

* cited by examiner

METHOD AND APPARATUS FOR SCHEDULING COMMUNICATION TRAFFIC IN ATCA-BASED EQUIPMENT

This application is the national phase under 35 U.S.C. §371 of PCT International Application No. PCT/IB2011/002293 which has an International filing date of Aug. 24, 2011, which designated the People's Republic of China and which claims priority to Chinese patent application number CN 201010503247.7 filed Sep. 28, 2010; the entire contents of each of which are hereby encorporated by reference.

FIELD OF THE INVENTION

The invention relates to the field of communication technology, and particularly to a method and apparatus for scheduling communication traffic in an Advanced Telecom Computing Architecture (referred to as ATCA) based equipment.

BACKGROUND OF THE INVENTION

ATCA architecture is an important hardware architecture for many telecom ATCA equipments. An ATCA architecture based equipment (hereinafter referred to as ATCA equipment) has low cost and high flexibility.

Figure 1:
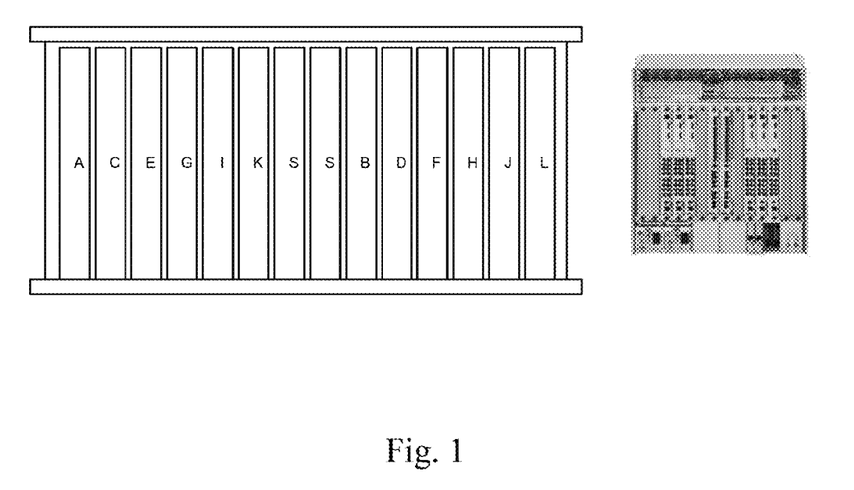
FIG. 1 is a schematic diagram of a typical ATCA equipment.

Generally, the ATCA equipment may be in the form of slot blade server. An ATCA chassis can host tens of blades (i.e., means for executing different functions) and the same or different application can run on each blade. FIG. 1 shows a typical ATCA equipment with two control blades A, B, ten real time blades C, D, E, F, G, H, I, J, K, L and two switch blades S arranged on the chassis. The control blades are used to manage all the other blades in the ATCA equipment. The real time blades are used to process communication traffic or host data. The switch blades are used to connect all these blades together to communicate with an external device. For every incoming packet, the control blades determine which real time blade could be assigned to handle it. When a new application is initiated, it is necessary to identify the real time blades available to be responsible for processing packets of the new application.

Therefore, the ATCA equipment needs to consider load balance and admission control mechanism for the blades to make efficient utilization of processing capabilities of all these blades. In addition, with more and more applications deployed in an ATCA chassis, how to make the best use of the ATCA equipment's capacity and how to schedule and balance requests from different applications is a key point.

Thus, the problem which needs to be solved is how to schedule and balance the requests from multiple applications to one blade of the ATCA equipment such that the whole ATCA equipment has optimum robustness and capacity.

Existing methods for scheduling communication traffic mainly include round robin method, weighted round robin method and CPU load based scheduling method. The existing scheduling methods will be briefly described as follows.

1. Round Robin Method

The Round Robin method is a static load balancing algorithm which does not take into consideration the current spare capacity of the respective traffic processing blades when assigning the new traffic, but instead distributes the workload to the traffic processing blades averagely. In this method, the traffic processing blades are selected sequentially in a cycle.

If the Round Robin method is used, the incoming packets will be distributed to each available traffic process blade one by one. For a given time period, the difference between the number of packets processed on the respective traffic processing blades is less than 1. The Round robin method works well in a system with traffic processing blades having the same configuration and the same running environment.

But for the ATCA equipment, each traffic processing blade is an autonomy system and the application running on each blade can be different. In such a case, the traffic processing blades are asymmetric configured blades, that is, the applications running on some traffic processing blades are more than those on other traffic processing blades so that the modules of an application running on these traffic processing blades are more than those on the other traffic processing blades.

Figure 2:
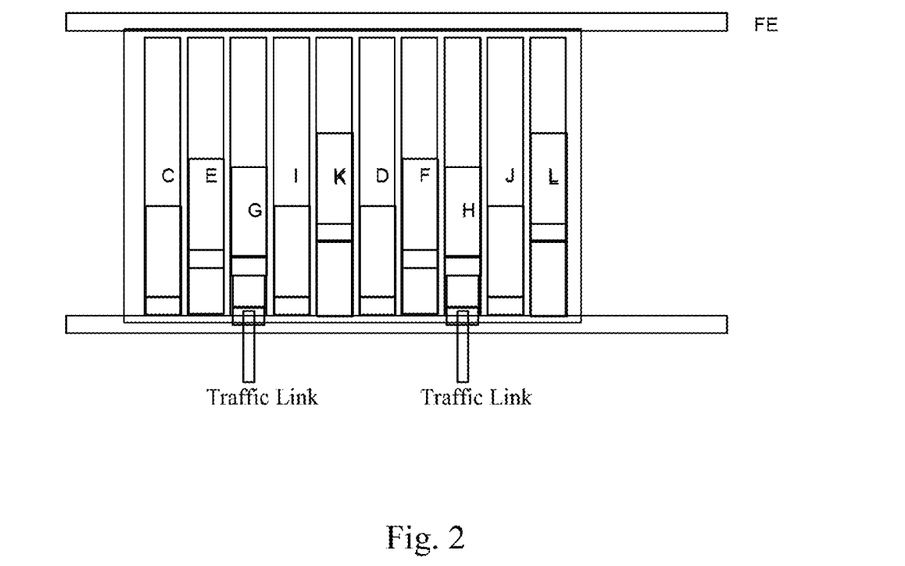
FIG. 2 is a schematic diagram of a case where the Round Robin method is used in an ATCA equipment with asymmetric configured traffic processing blades.

FIG. 2 is a schematic diagram of a case where the Round Robin method is used in an ATCA equipment with asymmetric configured traffic processing blades. As shown in FIG. 2, Home Subscriber Server HSS application is running on the traffic processing blades E and F, 3GPP Long Term Evolution (LTE) application is running on the traffic processing blades K and L, and Home Location Register HLR application and Mobile Number Portability MNP application are running on all traffic processing blades. In such a case, when the Round Robin method is used, there exists the situation where the resource usage of each traffic processing blade is uneven. For those traffic processing blades on which more applications are running, the CPU usage must be higher than others (see FIG. 2). It is easy to cause congestion and instability of the ATCA equipment so that the whole ATCA equipment utilization is low.

2. Weighted Round Robin Method

The Weighted Round Robin method is an extension of the Round Robin method. In this method, each traffic processing blade is assigned with a certain weight. The weight indicates processing capacity of the traffic processing blade. The weight can be preconfigured or dynamically changed. Assumed that is the weight of the application j on the traffic processing blade i. For each period, the traffic $T_{ij}$ can be distributed based on the weight:

$$T_{ij} = T * \left( w_{ij} / \sum_{i=1}^{N_j} w_{ij} \right)$$

Where the control target is that the traffic on each traffic processing blade is even:

$$T_{target,j} = \left( \sum_{i=1}^{N_j} T_{ij} \right)$$

The Weighted Round Robin method becomes dynamic if individual servers' capacities and their loads can be evaluated periodically. However, the Weighted Round Robin method is not efficient and cost-effective as it is hard to decide flexibly the weight of each traffic processing blade before the ATCA equipment receives the traffic. For example, if the control target is CPU balance, it needs experience to map the CPU usage with the application's communication traffic which is not flexible since the mixing of different communication traffic of the application may consume different CPU load.

3. CPU Load based Method

Figure 3:
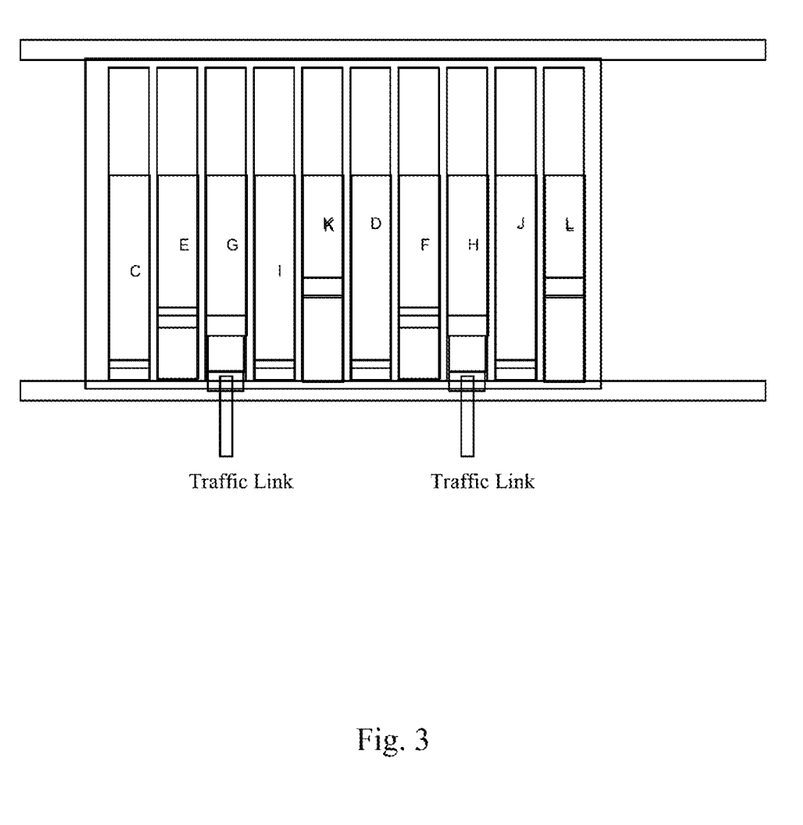
FIG. 3 is a schematic diagram of a case where the CPU load based scheduling method is used in the ATCA equipment with asymmetric configured traffic processing blades.

The CPU load (usage) based method is a dynamic (adaptive) traffic scheduling method, and schedules the communication traffic based on the changing CPU usage. The objective of this method is to make all the traffic processing blades support the same CPU usage and make decisions based on the changes in the total CPU usage. FIG. 3 shows a case where the CPU Load based method is used in the ATCA equipment with asymmetric configured blades.

With the CPU load based scheduling method, all the traffic processing blades have balanced CPU usages and may have higher capacity than any other methods which have uneven CPU usages. But in this scheduling method, the CPU usage of the ATCA equipment is shared by many tasks which may or may not be controlled by the applications contracted with customers. The capacity and throughput of the ATCA equipment is not only decided by the CPU capability but also has relationship with disk I/O rate, communication bandwidth, etc. The CPU usage of the applications on a blade is decided by the built in scheduling algorithms of an operation system and these scheduling methods not only take into consideration applications running on the operation system but also many systems related management and monitoring tasks, such that the CPU usage assigned to a specific application is impacted by predefined priority, dynamic running environment, as well as some unpredictable interrupts. Thus, the processing capability to the same application on different traffic processing blades is neither guaranteed to be the same nor to be stable all the time.

With the CPU load based scheduling method, each traffic processing blade must have the same processing capability for each application and the CPU usage assigned to each application must be stable and the disk I/O rate, transmission bandwidth of all traffic processing blades must also be the same. Otherwise the quality of service of an application on one blade might be worse than the other blades. For example, in FIG. 3, the traffic processing blade D is configured to write trace files upon receiving requests and the other traffic processing blades are configured only to receive requests and send responses. As the disk I/O takes long response time, the CPU usage of the traffic processing blade D is less than the other traffic processing blades, so more customer requests are distributed to the traffic processing blade D by the CPU load based scheduling method. Thus, if 1% requests coming to the traffic processing blade D are rejected because of queue length overflow while the other traffic processing blades have no requests failed, since the requests to the traffic processing blade D are more than those to the other traffic processing blades, the quality of service of the whole ATCA equipment is in the level of 1E-2 though the other traffic processing blades have better quality of service and processing capability.

So if the CPU usages of all traffic processing blades being balanced is the objective, it may result in some applications on some traffic processing blades have worse quality of service than the applications on the other traffic processing blades. But for the customers, the quality of service of the whole ATCA equipment is the most important; the degradation of the quality of service on one of these traffic processing blades can result in the conclusion that the quality of service of the whole ATCA equipment is degraded. The similar problems also exist for the Round Robin method and the Weighted Round Robin method.

SUMMARY OF THE INVENTION

The present invention is proposed in view of the above technical problems, and its objective is to provide a method for scheduling communication traffic in an ATCA equipment and corresponding apparatus, which considers not only the difference of the configuration and running environment between the traffic processing blades in the ATCA equipment, but also the dynamic service capability of each traffic processing blade to each application, and can balance well the load of the respective traffic processing blades in the ATCA equipment by adaptively adjusting distribution of incoming communication traffic of the ATCA equipment, and especially adapts to the ATCA equipment with asymmetric multi-application configuration, so as to guarantee the quality of service and capacity of the whole ATCA equipment.

According to one aspect of the present invention, a method for scheduling communication traffic in an ATCA architecture based equipment is provided, wherein the equipment includes at least a traffic processing means, said method comprising: collecting communication traffic information of the traffic processing means; generating a traffic distribution rule for the traffic processing means in next time period based on the collected communication traffic information; and scheduling incoming communication traffic of the equipment based on the generated traffic distribution rules.

According to another aspect of the present invention, an apparatus for scheduling communication traffic in an ATCA architecture based equipment is provided, wherein the equipment includes at least a traffic processing means, said apparatus comprising: collection module that collects communication traffic information of the traffic processing means; traffic distribution rule generation module that generates a traffic distribution rule for the traffic processing means in next time period based on the collected communication traffic information; and scheduling module that schedules incoming communication traffic of the equipment based on the generated traffic distribution rules.

DETAILED DESCRIPTION OF PREFERRED EMBODIMENTS

It is believed that the above and other objectives, features and advantages of the invention will become more apparent from the following detailed description of the preferred embodiments of the invention in conjunction with the drawings.

Figure 4:
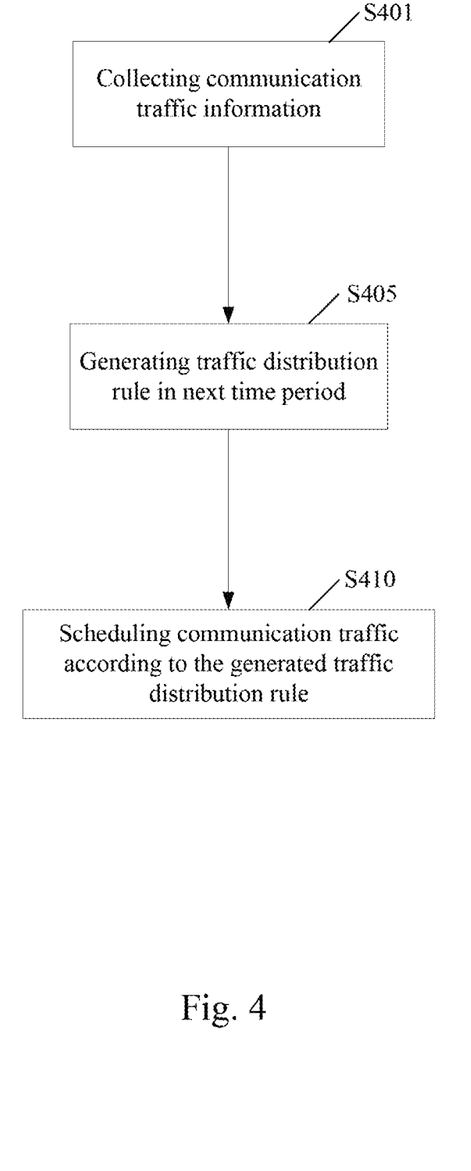
FIG. 4 is a flow chart of a method for scheduling communication traffic in the ATCA equipment in accordance with an embodiment of the present invention.

FIG. 4 shows a flow chart of a method for scheduling communication traffic in an ATCA equipment in accordance with an embodiment of the present invention. The embodiment will be described below in detail in conjunction of the drawing.

In this embodiment, the ATCA equipment includes at least a traffic processing means, which is equivalent to the traffic processing blade described in the Background part. The term "traffic processing means" is used in the following description.

As described above, performance degradation of a single traffic processing means of the ATCA equipment can make the quality of service of the whole ATCA equipment being reduced to be same as the degraded traffic processing means. That is, if the quality of service of one traffic processing means is 1E-2, that is, there is one call failure in 100 calls, then the whole ATCA equipment will have the quality of service of 1E-2 no matter whether other traffic processing means have better performance or have which existing method for scheduling communication traffic.

The method of this embodiment takes into account the quality of service and target capacity (e.g., target traffic rate) of the ATCA equipment to adaptively distribute the communication traffic to the traffic processing means which has the higher traffic throughput with QoS guarantee.

As shown in FIG. 4, in step S401, the communication traffic information of all the traffic processing means in the ATCA equipment is collected. In this embodiment, the communication traffic information includes incoming traffic and dropped traffic. Specifically, in each time period, the incoming traffic and dropped traffic on the traffic processing means are measured. With the collected communication traffic information, the quality of service of the traffic processing means may be monitored so that when a traffic processing means has worse quality of service than its requirement, its processing capability is evaluated.

Then, in step S405, based on the communication traffic information collected in step S401, the traffic distribution rule for the traffic processing means in the next time period is generated.

In this embodiment, each traffic processing means of the ATCA equipment is modeled as an M/M/1 queuing system with each traffic processing means having separate CPU/memory. In each time period, assuming that an incoming traffic rate and a traffic loss rate on the traffic processing means are $\lambda$ and r, respectively, and according to the queuing theory, there exists $$r = \frac{\lambda}{\lambda + \mu} \quad (1)$$

Where $\mu$ is the processing rate of the traffic processing means, which reflects the real time processing capability of the traffic processing means. Although each traffic processing means has the same CPU/memory, its processing capability to the applications is not the same because of its different configuration and running environment. According to the formula (1), $\mu$ reflecting the real time processing capability of the traffic processing means to different application may be estimated from the communication traffic information of the traffic processing means. Thus, the traffic rate to be distributed to the traffic processing means in next time period may be calculated based on its current processing rate $\mu$, loss rate r and predetermined quality of service q (e.g. the call failure rate of the traffic processing means in the embodiment).

Figure 5:
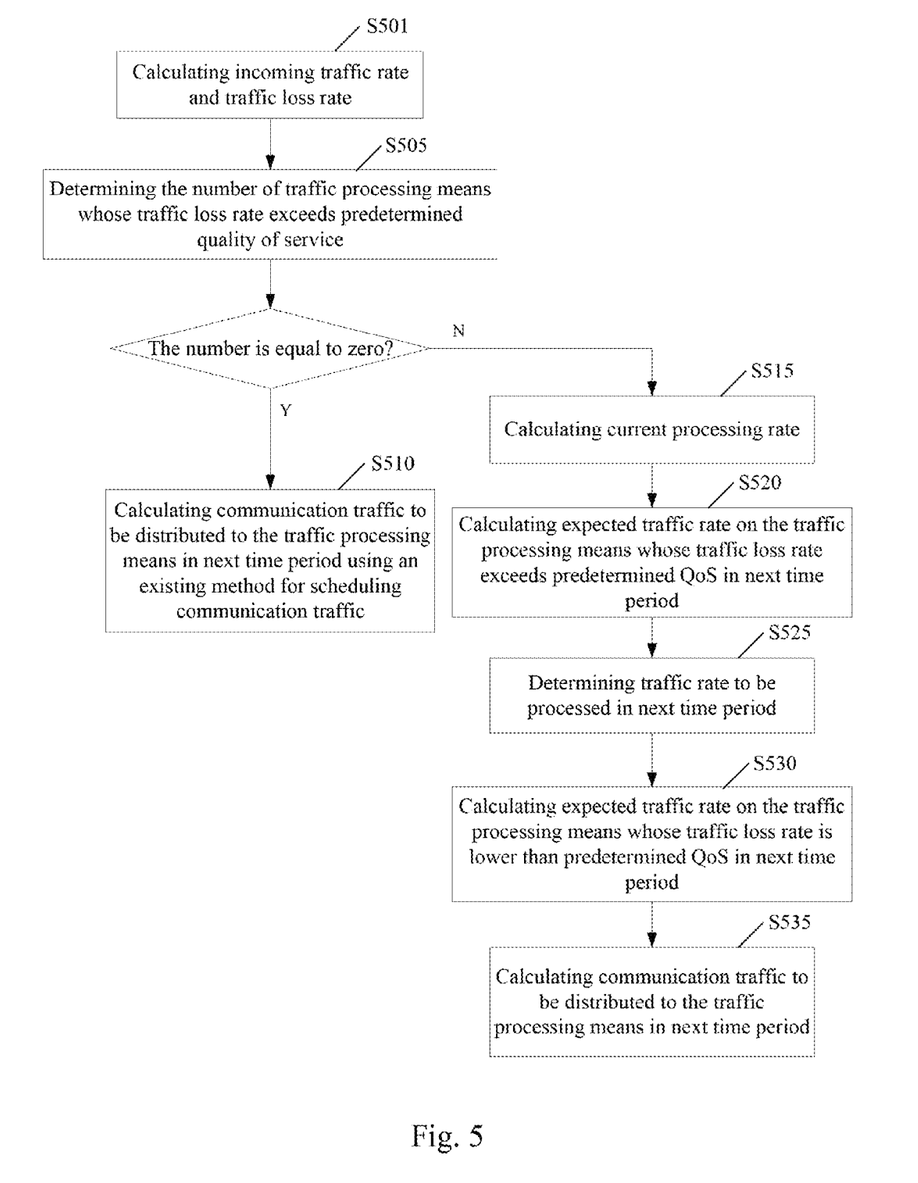
FIG. 5 is a flow chart of the step of generating a traffic distribution rule for the traffic processing means in next time period in the embodiment shown in FIG. 4.

FIG. 5 shows a flow chart of the step S405 of generating the traffic distribution rule for the traffic processing means in next time period in the embodiment of FIG. 4. As shown in FIG. 5, the following operations will be performed for each application running on the ATCA equipment. First, in step S501, based on the incoming traffic and dropped traffic measured in step S401, the incoming traffic rate and traffic loss rate of the application on the traffic processing means is calculated. Then, in step S505, the number of the traffic processing means whose traffic loss rate exceeds a predetermined quality of service among the traffic processing means on which the application is running is determined by comparing the traffic loss rate and the predetermined quality of service. As mentioned above, if the traffic loss rate of the traffic processing means exceeds the predetermined quality of service, it is indicated that the performance of the traffic processing means is degraded, and the processing capability of the traffic processing means need to be re-evaluated to decide how much communication traffic to be scheduled to it in next time period.

If the number of traffic processing means whose traffic loss rate exceeds the predetermined quality of service determined in step S505 is equal to zero, in step S510, the communication traffic of the application to be distributed to the traffic processing means in next time period is calculated using any one of the existing methods for scheduling communication traffic.

If the number of traffic processing means whose traffic loss rate exceeds the predetermined quality of service determined in step S505 is not equal to zero, steps S515 and S520 are performed for the traffic processing means whose traffic loss rate exceeds the predetermined quality of service, and steps S525 and S530 are performed for the traffic processing means whose traffic loss rate is lower than the predetermined quality of service. Although it is described in the order of steps S515, S520, S525 and S530, those skilled in the art should understand that the steps S515, S520 and the steps S525, S530 can be executed in parallel.

Specifically, in step S515, the current processing rate of the application on the traffic processing means whose traffic loss rate exceeds the predetermined quality of service is calculated based on the incoming traffic rate and the traffic loss rate, and in step S520, —an expected traffic rate of the application on the traffic processing means in next time period is calculated based on the current processing rate.

In step S525, for the traffic processing means whose traffic loss rate is lower than the predetermined quality of service, the traffic rate of the application to be processed in next time period is determined based on the incoming traffic rate and a target traffic rate. Then, in step S530, the expected traffic rate of the application on the traffic processing means in next time period is calculated based on the determined traffic rate of the application to be processed in next time period.

Then, in step 535, the communication traffic of the application to be distributed to the traffic processing means is calculated based on the expected traffic rate on the traffic processing means in next time period calculated in steps S520 and S530.

The processes of executing the step S405 in the case where a single application runs on the ATCA equipment and the case where multiple applications run on the ATCA equipment are described in detail below.

Case 1: Single Application Running on the ATCA Equipment

For an ATCA equipment with the single application, the target capacity C and the predetermined quality of service of the application q is the goal.

At the initialization phase, all traffic processing means of the ATCA equipment are taken as having the same processing capability and the communication traffic distributed to the traffic processing means is C/N, in which N is the total number of the traffic processing means.

At time period t, based on the collected incoming traffic $T_k(t)$ and dropped traffic $P_k(t)$ of the traffic processing means, the incoming traffic rate $\lambda_k(t)$ and the traffic loss rate $q_k(t)$ of the traffic processing means are calculated according to formulas (2) and (3), respectively, where k=1, ..., N, $$\lambda_k(t) = T_k(t)/\tau \quad (2)$$

$$q_k(t) = P_k(t)/T_k(t) \quad (3)$$

where $\tau$ is the duration of the time period.

Then, the number $N_1$ of traffic processing means whose quality of service cannot meet the predetermined quality of service (i.e. $q_k(t) > q$) is determined. If the traffic processing means cannot meet the quality of service requirement q, its service processing capability needs to be calculated.

If $N_1$ is equal to zero, any one of the existing methods for scheduling communication traffic may be used to calculate the communication traffic to be distributed to the traffic processing means in next time period. In this example, the CPU load based method is used. First, the target CPU usage of the traffic processing means in next time period is calculated as follows:

$$CPU_{target}(t+1) = \left(\sum_{k=1}^{N} CPU_k(t)\right) \bigg/ N \quad (4)$$

where $CPU_k(t)$ is the CPU usage of the traffic processing means k in the time period t, and may be collected together with the incoming traffic and the dropped traffic of the traffic processing means k. Then, the communication traffic to be distributed to the traffic processing means in next time period (t+1) is calculated as follows:

$$D_k(t+1) = D_k(t) + [D_k(t) - D_k(t-1)] * \frac{[CPU_{target}(t+1) - CPU_k(t)]}{[CPU_k(t) - CPU_k(t-1)]} \quad (5)$$

where $D_k(t)$ is the communication traffic distributed to the traffic processing means k in the time period t.

If $N_1$ is greater than zero, for the traffic processing means k with $q_k(t) > q$, the current processing rate of the traffic processing means k is calculated as follows:

$$\mu_k(t) = \frac{\lambda_k(t)(1 - q_k(t))}{q_k(t)} \quad (6)$$

Then, the expected traffic rate of the traffic processing means k with $q_k(t) > q$ in next time period (t+1) is calculated as follows:

$$\lambda_k(t+1) = \lambda_k(t) - \alpha\left(\lambda_k(t) - \frac{q\mu_k(t)}{1-q}\right) \quad (7)$$

where $\alpha$ is a traffic tunable parameter and $0 \le \alpha \le 1$ to prevent the communication traffic from changing too much in a short period of time to generate flip/flop impact. Preferably, if $0 < \alpha < 1$, it can be guaranteed that the traffic load can be converged to the expected load $$\Lambda = \frac{q\mu_k(t)}{1-q}$$

if $\mu_k(t)$ is stable.

In addition, for the traffic processing means k with $q_k(t) < q$, the traffic rate to be processed in next time period is calculated as follows:

$$C' = \max\left(\sum_{k=1}^{N} \lambda_k(t), C\right) \quad (8)$$

Then, the expected traffic rate of the traffic processing means k with $q_k(t) < q$ in next time period (t+1) is calculated as follows:

$$\lambda_k(t+1) = \left(C' - \sum_{q_k(t) > q} \lambda_k(t+1)\right) \bigg/ (N - N_1) \quad (9)$$

Then, according to the expected traffic rates of the traffic processing means k in next time period calculated from the formulas (7) and (9), the communication traffic to be distributed to the traffic processing means k in next time period (t+1) is calculated as follows:

$$D_k(t+1) = 1000 * \lambda_k(t+1) \bigg/ \sum_{i=1}^{N} \lambda_i(t+1).$$

In this case, all the traffic processing means are divided into two types: one is the traffic processing means satisfying the quality of service, that is, $q_k(t) < q$; the other is the traffic processing means not satisfying the quality of service, that is, $q_k(t) > q$.

Case 2: Multiple Applications Running on the ATCA Equipment

In this case, as each traffic processing means of the ATCA equipment has different application configuration, and the processing capability to each application is not the same, it needs to know which traffic processing means of the ATCA equipment support which applications, that is, the traffic of which application is allowed to be distributed to which traffic processing means. In this case, flag $f_{ik}$ is used to indicate whether an application is supported on a traffic processing means, wherein $f_{ik}=1$ means that the application i is supported on the traffic processing means k, $f_{ik}=0$ means that the application i is not supported on the traffic processing means k. For the ATCA equipment on which multiple applications are running, the goal is, for all applications i=1, ..., M, to ensure that each application can meet its target capacity $C_i$ and the quality of service $q_i$.

In the time period t, for the application i, according to the formulas (2) and (3), the incoming traffic rate $\lambda_{ik}(t)$ and the traffic loss rate $q_{ik}(t)$ of the traffic processing means k are calculated, where k=1, ..., N.

Then, in the traffic processing means on which the application i is running, namely, in the traffic processing means with $f_{ik}=1$, the number $N_{i,1}$ of traffic processing means whose quality of service can not meet the predetermined quality of service (i.e. $q_{ik}(t) > q_i$) is determined.

If $N_{i,1}$ is equal to zero, any one of the existing methods for scheduling communication traffic is used to calculate the communication traffic of the application i to be distributed to the traffic processing means in next time period, such as the Round Robin method, the Weighted Round Robin method, the CPU load based scheduling method, etc. In this case, the CPU load based method is used. First, the target CPU usage of the application i on the traffic processing means in next time period is calculated as follows:

$$CPU_{i,target}(t+1) = \left(\sum_{k=1}^{N} f_{ik} CPU_{ik}(t)\right) / N_i \qquad (10)$$

where $CPU_{ik}(t)$ is the CPU usage of the application i on the traffic processing means k in the time period t, and $N_i$ is the total number of the traffic processing means on which the application i is running. Then, the communication traffic of the application i to be distributed to the traffic processing means in next time period (t+1) is calculated as follows:

$$D_{ik}(t+1) = \qquad (11)$$
$$D_{ik}(t) + [D_{ik}(t) - D_{ik}(t-1)] * \frac{[CPU_{i,target}(t+1) - CPU_{ik}(t)]}{[CPU_{ik}(t) - CPU_{ik}(t-1)]}$$

where $D_{ik}(t)$ is the communication traffic of the application i distributed to the traffic processing means k in the time period t.

If $N_{i,1}$ is not equal to zero, for the traffic processing means k with $q_{ik}(t) > q_i$, the current processing rate of the application i on the traffic processing means k is calculated as follows:

$$\mu_{ik}(t) = \frac{\lambda_{ik}(t)(1 - q_{ik}(t))}{q_{ik}(t)} \qquad (12)$$

The expected traffic rate of the application i on the traffic processing means k with $q_{ik}(t) > q_i$ in next time period (t+1) is calculated as follows:

$$\lambda_{ik}(t+1) = \lambda_{ik}(t) - \alpha_i \left(\lambda_{ik}(t) - \frac{q_i \mu_{ik}(t)}{1 - q_i}\right) \qquad (13)$$

For the traffic processing means k with $q_{ik}(t) < q_i$, the traffic rate of the application i to be processed in next time period is calculated as follows:

$$C_i' = \max\left(\sum_{k=1}^{N} f_{ik}\lambda_{ik}(t), C_i\right) \qquad (14)$$

Then, the expected traffic rate of the application i on the traffic processing means k with $q_{ik}(t) < q_i$ in next time period (t+1) is calculated as follows:

$$\lambda_{ik}(t+1) = \left(C_i' - \sum_{q_{ik}(t) > q_i} \lambda_{ik}(t+1)\right) / (N_i - N_{i,1}) \qquad (15)$$

Then, according to the expected traffic rates of the application i on the traffic processing means k calculated from the formulas (13) and (15), the communication traffic of the application i to be distributed to the traffic processing means k in next time period (t+1) is calculated as follows:

$$D_{ik}(t+1) = 1000 * \lambda_{ik}(t+1) / \sum_{j=1}^{N} f_{ij}\lambda_{ij}(t+1) \qquad (16)$$

The above two examples are the processing capability based traffic distribution which considers the load balance and traffic loss rate on the traffic processing means to improve the system capacity.

Besides the above processing capability based traffic distribution, the traffic loss rate based traffic distribution may be used. The case where a single application runs on the ATCA equipment and the case where multiple applications run on the ATCA equipment are described below.

Case 3: Single Application Running on the ATCA Equipment

In this case, the traffic distribution rule is represented as the expected traffic rate to be distributed to the traffic processing means k in next time period.

First, in the time period t, according to the formulas (2) and (3), the incoming traffic rate $\lambda_k(t)$ and the traffic loss rate $q_k(t)$ of the traffic processing means k are calculated based on the incoming traffic and the dropped traffic collected in step S401, where k=1, . . . , N.

Then, based on the calculated traffic loss rate $q_k(t)$, a ratio of the communication traffic to be distributed to the traffic processing means k in next time period (t+1) is calculated as follows:

$$r_k = \frac{1/q_k}{\sum_{k=1}^{N} 1/q_k} \qquad (17)$$

Thus, the expected traffic rate to be distributed to the traffic processing means k in next time period (t+1) is calculated as $\lambda_k(t+1) = C \times r_k$, where C is the target capacity of the ATCA equipment.

Case 4: Multiple Applications Running on the ATCA Equipment

For the application i (i=1, . . . , M), first, according to the formulas (2) and (3), the incoming traffic rate $\lambda_k^i(t)$ and the traffic loss rate $q_k^i(t)$ of the application i on the traffic processing means k are calculated based on the incoming traffic and the dropped traffic collected in step S401. Next, the total traffic rate of the application i is obtained:

$$\Lambda^i(t) = \sum_{k=1}^{N} \lambda_k^i \qquad (18)$$

Then, based on the calculated traffic loss rate $q_k^i(t)$, a ratio of the communication traffic to be distributed to the traffic processing means k in next time period (t+1) is calculated as follows:

$$r_k^i = \frac{1/q_k^i}{\sum_{k=1}^{N} 1/q_k^i} \qquad (19)$$

Thus, the expected traffic rate of the application i to be distributed to the traffic processing means k in next time period (t+1) is calculated as:

$$\lambda_k^i(t+1) = \Lambda^i(t) \times r_k^i \qquad (20)$$

After the traffic distribution rule of the traffic processing means in next time period is generated, in step S410, the incoming communication traffic of the ATCA equipment is scheduled based on the generated traffic distribution rule. In the embodiment, when the incoming communication traffic of the ATCA equipment is received, according to the traffic distribution rule, the traffic processing means which will process the received communication traffic is determined, and then the received communication traffic is routed to the determined traffic processing means. Furthermore, a new traffic distribution table may be generated based on the new traffic distribution rule and the old traffic distribution table is updated.

It can be seen from the above description that the method for scheduling communication traffic in the ATCA equipment of the embodiment is the scheduling method based on the quality of service QoS for the ATCA equipment, which directly takes the QoS of the ATCA equipment as the goal, and uses the queuing theory to solve the scheduling problem of the ATCA equipment, especially the ATCA equipment with asymmetric configured traffic processing means so as to schedule and balance the communication traffic of the ATCA equipment very well to make it have stronger robustness and higher capacity. Therefore, the method of the embodiment can balance the load of the traffic processing means in the ATCA equipment with asymmetric multi-application configuration very well, and can also guarantee the QoS and capacity of the whole ATCA equipment. Even if the quality of service of one traffic processing means in the ATCA equipment has been reduced to 1E-2 in some moment, the method of the embodiment can guarantee that the ATCA equipment maintains its contracted quality of service. In addition, the method of the embodiment takes into account the dynamic processing capability and running environment of each traffic processing means, and can adaptively distribute the communication traffic to ensure the quality of service and capacity of the whole ATCA equipment. In addition, the method of the embodiment can be implemented simply.

Figure 6:
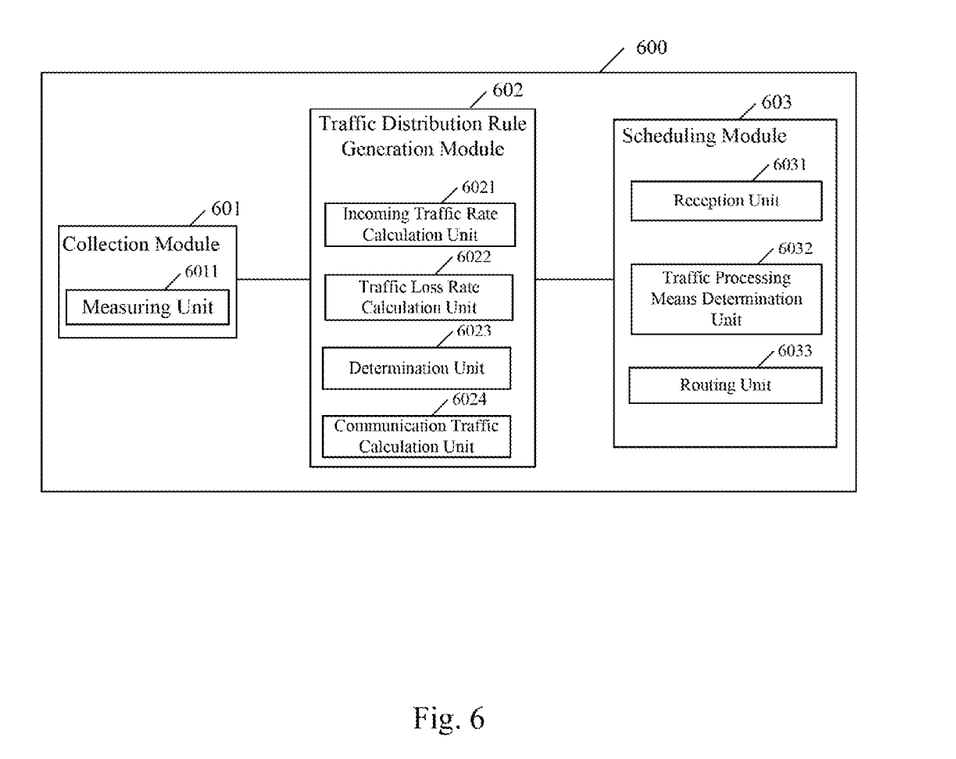
FIG. 6 is a schematic block diagram of an apparatus for scheduling communication traffic in the ATCA equipment in accordance with an embodiment of the present invention.

Under the same inventive concept, FIG. 6 shows a schematic block diagram of an apparatus 600 for scheduling communication traffic in the ATCA equipment according to one embodiment of prevent invention. The embodiment will be described in detail below in conjunction with the figure, wherein for the same parts as those in the previous embodiment, their description will be omitted properly.

In this embodiment, the ATCA equipment includes at least a traffic processing means. As mentioned above, in addition to the traffic processing means, the ATCA equipment can include control means for controlling the traffic processing means.

As shown in FIG. 6, the apparatus 600 of this embodiment includes: collection module 601 which collects communication traffic information of the traffic processing means; traffic distribution rule generation module 602 which generates a traffic distribution rule for the traffic processing means in next time period based on the communication traffic information collected by the collection module 601; and scheduling module 603 which schedules incoming communication traffic of the ATCA equipment based on the generated traffic distribution rule.

In the collection module 601, measurement unit 6011 measures the incoming traffic and the dropped traffic on the traffic processing means. In addition, if necessary, the collection module 601 may include a unit for acquiring the CPU usage of the traffic processing means (not shown).

The collection module 601 may be arranged apart from the ATCA equipment as a separate module, or be arranged on each traffic processing means.

In the traffic distribution rule generation module 602, for each application running on the ATCA equipment, incoming traffic rate calculation unit 6021 calculates the incoming traffic rate of the application on the traffic processing means based on the incoming traffic from the collection module 601. Meanwhile, traffic loss rate calculation unit 6022 calculates the traffic loss rate of the application on the traffic processing means based on the incoming traffic and the dropped traffic provided by the collection module 601. Then, determination unit 6023 determines the number of traffic processing means whose traffic loss rate exceeds the predetermined quality of service among the traffic processing means on which the application is running, and communication traffic calculation unit 6024 executes subsequent process based on the number.

When the number of traffic processing means determined by the determination unit 6023 is equal to zero, the communication traffic calculation unit 6024—calculates the communication traffic of the application to be distributed to the traffic processing means in next time period using any one of the existing methods for scheduling communication traffic.

When the number of traffic processing means determined by the determination unit 6023 is not equal to zero, for the traffic processing means whose traffic loss rate exceeds the predetermined quality of service, the communication traffic calculation unit 6024 calculates the current processing rate of the application on the traffic processing means whose traffic loss rate exceeds the predetermined quality of service based on the incoming traffic rate and the traffic loss rate calculated in the incoming traffic rate calculation unit 6021 and the traffic loss rate calculation unit 6022 respectively, and further calculates the expected traffic rate of the application on the traffic processing means whose traffic loss rate exceeds the predetermined quality of service in next time period based on the calculated current processing rate. In addition, for the traffic processing means whose traffic loss rate is lower than the predetermined quality of service, the communication traffic calculation unit 6024 determines the traffic rate of the application to be processed in next time period based on the incoming traffic rate calculated in the incoming traffic rate calculation unit 6021 and the target capacity of the application, and further calculates the expected traffic rate of the application on the traffic processing means whose traffic loss rate is lower than the predetermined quality of service in next time period. Finally, the communication traffic calculation unit 6024 calculates the communication traffic to be distributed to the traffic processing means in next time period based on the calculated expected traffic rates of the application on the traffic processing means whose traffic loss, rate exceeds the predetermined quality of service and on the traffic processing means whose traffic loss rate is lower than the predetermined quality of service respectively in next time period.

It can be seen from the above description that in this embodiment the traffic distribution rule generation module 602 executes the traffic distribution based on the processing capability of the traffic processing means, and its components can execute the calculation according to the formulas in the previous cases 1 and 2.

In another embodiment, the traffic distribution rule generation module 602 executes the traffic distribution based on the traffic loss rate.

When a single application runs on the ATCA equipment, in the traffic distribution rule generation module 602, the incoming traffic rate calculation unit calculates the incoming traffic rate on the traffic processing means based on the incoming traffic from the collection module 601, and at the same time, the traffic loss rate calculation unit calculates the traffic loss rate on the traffic processing means based on the incoming traffic and the dropped traffic provided by the collection module 601. Then, ratio calculation unit calculates the ratio of the communication traffic to be distributed to the traffic processing means in next time period based on the traffic loss rate calculated in the traffic loss rate calculation unit, and the expected traffic rate calculation unit calculates the expected traffic rates to be distributed to the traffic processing means in next time period based on the calculated ratio and the target capacity of the ATCA equipment.

In this case, the components of the traffic distribution rule generation module 602 may executes the calculation according to the formulas in the case 3 described previously.

When multiple applications run on the ATCA equipment, in the traffic distribution rule generation module 602, for each of the applications, the incoming traffic rate calculation unit calculates the incoming traffic rate of the application on the traffic processing means based on the incoming traffic from the collection module 601, and at the same time, the traffic loss rate calculation unit calculates the traffic loss rate of the application on the traffic processing means based on the incoming traffic and the dropped traffic from the collection module 601. Next, total traffic rate calculation unit calculates the total traffic rate of the application. Then, the ratio calculation unit calculates the ratio of the communication traffic to be distributed to the traffic processing means in next time period based on the traffic loss rate calculated in the traffic loss rate calculation unit, and the expected traffic rate calculation unit calculates the expected traffic rate of the application to be distributed to the traffic processing means in next time period based on the calculated total traffic rate and the ratio.

In this case, the components of the traffic distribution rule generation module 602 may execute the calculation according to the formulas in the case 4 described previously.

Similarly, the traffic distribution rule generation module 602 can be arranged apart from the ATCA equipment as a separate module, or can be arranged in the control means of the ATCA equipment.

The traffic distribution rule generation module 602 provides the generated traffic distribution rule to the scheduling module 603 to distribute the incoming communication traffic. In the scheduling module 603, when reception unit 6031 receives the incoming communication traffic of the ATCA equipment, traffic processing means determination unit 6032 determines the traffic processing means which will process the received communication traffic based on the traffic distribution rule, and routing unit 6033 routes the received communication traffic to the determined traffic processing means. In addition, the traffic distribution rule can be stored in the scheduling module 603, and when the scheduling module 603 obtains the new traffic distribution rule, it generates the new traffic distribution table and updates the old traffic distribution table.

It should be noted that the apparatus 600 for scheduling communication traffic in the ATCA equipment in this embodiment can operatively implement the method for scheduling communication traffic as shown in FIGS. 4 and 5. The apparatus 600 of the embodiment can be a standalone apparatus or be integrated in the ATCA equipment.

It should be noted that the apparatus 600 for scheduling communication traffic in the ATCA equipment in this embodiment and its components can be implemented by hardware circuit such as Large Scale Integrated Circuit or gate arrays, semiconductors such as logic chip, transistor, etc., or programmable hardware devices such as field programmable gate array, programmable logic device, etc., or can be implemented by software which can be executed by various processors, or can be implemented by the combination of the above hardware circuit and software.

Figure 7:
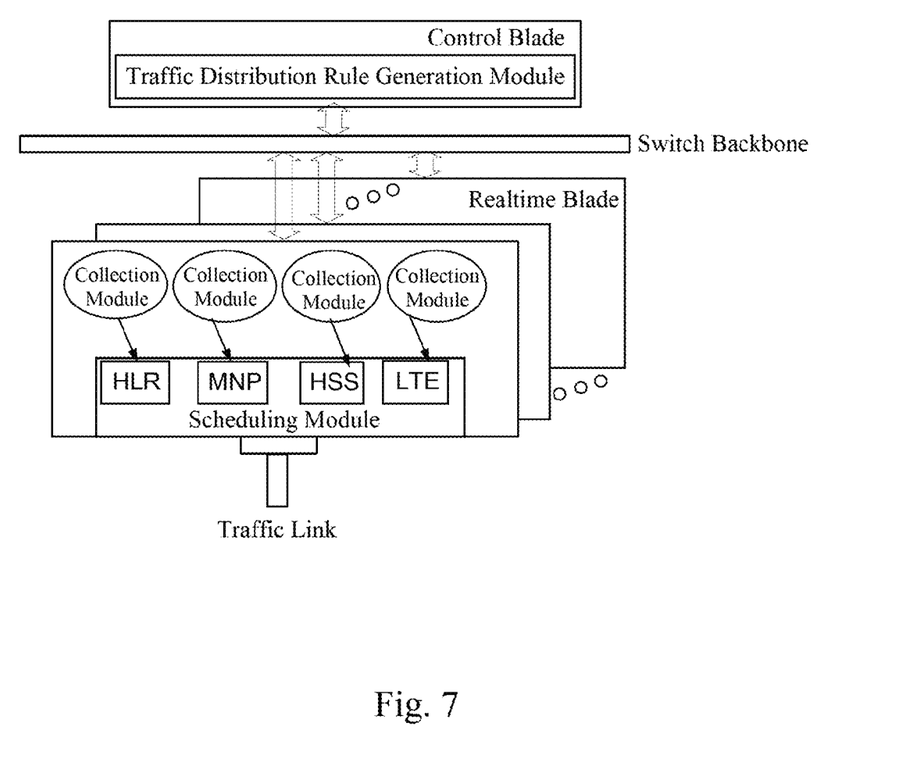
FIG. 7 is a schematic diagram of an example of implementing the apparatus shown in FIG. 6.

FIG. 7 shows a schematic diagram of an example of implementing the apparatus as shown in FIG. 6. In FIG. 7, the ATCA equipment includes a control blade as the control means and multiple real time blades as the traffic processing means, and the control blade communicates with the real time blades through the switching backplane. As shown in FIG. 7, a collection module is arranged on each real time blades for each application, the traffic distribution rule generation module is arranged on the control blade, and the scheduling module is connected with traffic link.

In operation, the collection module on the real time blade collects the resource and load information of the blade, including the CPU usage, the number of the incoming traffic of each application, the number of the dropped traffic, etc., and in the end of each time period, generates a message including the resources and the load information, and sends it to the traffic distribution rule generation module.

The traffic distribution rule generation module knows the resource related information of all the applications on each real time blade through the collection module, calculates a new traffic distribution rule based on the information periodically, and informs the scheduling module of the new traffic distribution rule.

After obtaining the new traffic distribution rule from the traffic distribution rule generation module, the scheduling module generates a new traffic distribution table to update the old one. When the communication traffic enters into the ATCA equipment, the traffic distribution table is checked to decide which real time blade the communication traffic will be distributed, and the communication traffic is routed to the selected blade.

Although the method and apparatus for scheduling communication traffic in an Advanced Telecom Computing Architecture based equipment have been described through some exemplary embodiments, these embodiments are not exhaustive, and those skilled in the art can realize various changes and modifications within the spirit and scope of the invention. Therefore, the present invention is not limited to these embodiments, and the scope of which is only defined by the appended claims.

The invention claimed is:

1. A method for scheduling communication traffic in an Advanced Telecom Computing Architecture based equipment, wherein the equipment includes at least a traffic processing means, said method comprising:
    collecting communication traffic information of the traffic processing means;
    generating a traffic distribution rule for the traffic processing means in next time period based on the collected communication traffic information; and
    scheduling incoming communication traffic of the equipment based on the generated traffic distribution rule;
    wherein the traffic processing means comprises a plurality of asymmetrically configured blades where a first number of applications running on some traffic processing blades are more than a second number of applications running on other traffic processing blades.

2. The method according to claim 1, wherein the step of collecting communication traffic information of the traffic processing means comprises:
    measuring incoming traffic and dropped traffic on the traffic processing means.

3. The method according to claim 2, wherein the step of generating a traffic distribution rule for the traffic processing means in next time period based on the collected communication traffic information comprises: for each application running on the equipment, calculating an incoming traffic rate and a traffic loss rate of the application on the traffic processing means based on the incoming traffic and the dropped traffic;

determining the number of traffic processing means whose traffic loss rate exceeds a predetermined quality of service among the traffic processing means on which the application is running;

if the determined number of traffic processing means is equal to zero, calculating the communication traffic of the application to be distributed to the traffic processing means in next time period using an existing method for scheduling communication traffic;

if the determined number of traffic processing means is not equal to zero, for the traffic processing means whose traffic loss rate exceeds the predetermined quality of service:

calculating current processing rate of the application on the traffic processing means based on the incoming traffic rate and the traffic loss rate;

calculating an expected traffic rate of the application on the traffic processing means in next time period based on the current processing rate;

for the traffic processing means whose traffic loss rate is lower than the predetermined quality of service:

determining the traffic rate of the application to be processed in next time period based on the incoming traffic rate and a target traffic rate;

calculating an expected traffic rate of the application on the traffic processing means in next time period based on the determined traffic rate of the application to be processed in next time period; and calculating the communication traffic of the application to be distributed to the traffic processing means in next time period based on the calculated expected traffic rates of the application on the traffic processing means in next time period.

4. The method according to claim 3, wherein the existing method for scheduling communication traffic is any one of Round Robin method, Weighted Round Robin method and CPU load based scheduling method.

5. The method according to claim 2, wherein a single application runs on the equipment;

the step of generating a traffic distribution rule for the traffic processing means in next time period based on the collected communication traffic information comprises:

calculating an incoming traffic rate and a traffic loss rate on the traffic processing means based on the incoming traffic and the dropped traffic;

calculating a ratio of the communication traffic to be distributed to the traffic processing means in next time period based on the traffic loss rate; and calculating an expected traffic rate to be distributed to the traffic processing means in next time period based on the calculated ratio and a target traffic rate.

6. The method according to claim 2, wherein multiple applications run on the equipment;

the step of generating a traffic distribution rule for the traffic processing means in next time period based on the collected communication traffic information comprises:

for each of the multiple applications, calculating an incoming traffic rate and a traffic loss rate of the application on the traffic processing means based on the incoming traffic and the dropped traffic;

calculating a total traffic rate of the application;

calculating a ratio of the communication traffic to be distributed to the traffic processing means in next time period based on the traffic loss rate; and calculating an expected traffic rate of the application to be distributed to the traffic processing means in next time period based on the total traffic rate and the calculated ratio.

7. The method according to claim 1, wherein the step of scheduling incoming communication traffic of the equipment based on the generated traffic distribution rule comprises:

receiving the incoming communication traffic of the equipment;

determining traffic processing means which will process the received communication traffic based on the traffic distribution rule; and routing the received communication traffic to the determined traffic processing means.

8. An apparatus for scheduling communication traffic in an Advanced Telecom Computing Architecture based equipment, wherein the equipment includes at least a traffic processing means, said apparatus comprising:

collection module that collects communication traffic information of the traffic processing means;

traffic distribution rule generation module that generates a traffic distribution rule for the traffic processing means in next time period based on the collected communication traffic information; and scheduling module that schedules incoming communication traffic of the equipment based on the generated traffic distribution rule;

wherein the traffic processing means comprises a plurality of asymmetrically configured blades where a first number of applications running on some traffic processing blades are more than a second number of applications running on other traffic processing blades.

9. The apparatus according to claim 8, wherein the collection module comprises:

measuring unit that measures incoming traffic and dropped traffic on the traffic processing means.

10. The apparatus according to claim 9, wherein the collection module is arranged on each traffic processing means.

11. The apparatus according to claim 9, wherein the traffic distribution rule generation module comprises:

incoming traffic rate calculation unit that, for each application running on the equipment, calculates an incoming traffic rate of the application on the traffic processing means based on the incoming traffic;

traffic loss rate calculation unit that calculates a traffic loss rate of the application on the traffic processing means based on the incoming traffic and the dropped traffic;

determination unit that determines the number of traffic processing means whose traffic loss rate exceeds a predetermined quality of service among the traffic processing means on which the application is running;

communication traffic calculation unit that, if the number of traffic process means determined by the determination unit is equal to zero, calculates the communication traffic of the application to be distributed to the traffic processing means in next time period using an existing method for scheduling communication traffic; that, if the determined number of traffic processing means is not equal to zero, for the traffic processing means whose traffic loss rate exceeds the predetermined quality of service, calculates current processing rate of the application on the traffic processing means based on the incoming traffic rate and the traffic loss rate and calculates an expected traffic rate of the application on the traffic processing means in next time period based on the current processing rate; for the traffic processing means whose traffic loss rate is lower than the predetermined quality of service, determines the traffic rate of the application to be processed in next time period based on the incoming traffic rate and a target traffic rate, calculates an expected traffic rate of the application on the traffic processing means in next time period based on the determined traffic rate of the application to be processed in next time period, and calculates the communication traffic of the application to be distributed to the traffic processing means in next time period based on the calculated expected traffic rates of the application on the traffic processing means in next time period.

12. The apparatus according to claim 11, wherein the existing method for scheduling communication traffic is any one of Round Robin method, Weighted Round Robin method and CPU load based scheduling method.

13. The apparatus according to claim 9, wherein a single application runs on the equipment;
and wherein the traffic distribution rule generation module comprises:
incoming traffic rate calculation unit that calculates an incoming traffic rate on the traffic processing means based on the incoming traffic;
traffic loss rate calculation unit that, calculates a traffic loss rate on the traffic processing means based on the incoming traffic and the dropped traffic;
ratio calculation unit that calculates a ratio of the communication traffic to be distributed to the traffic processing means in next time period based on the traffic loss rate; and
expected traffic rate calculation unit that calculates an expected traffic rate to be distributed to the traffic processing means in next time period based on the calculated ratio and a target traffic rate.

14. The apparatus according to claim 9, wherein multiple applications run on the equipment;
and wherein the traffic distribution rule generation module comprises:
incoming traffic rate calculation unit that, for each of the multiple applications, calculates an incoming traffic rate of the application on the traffic processing means based on the incoming traffic;
traffic loss rate calculation unit that calculates a traffic loss rate of the application on the traffic processing means based on the incoming traffic and the dropped traffic;
total traffics rate calculation unit that calculates a total traffic rate of the application;
ratio calculation unit that calculates a ratio of the communication traffic to be distributed to the traffic processing means in next time period based on the traffic loss rate; and
expected traffic rate calculation unit that calculates an expected traffic rate of the application to be distributed to the traffic processing means in next time period based on the total traffic rate and the calculated ratio.

15. The apparatus according to claim 8, wherein the scheduling module comprises:
reception unit that receives the incoming communication traffic of the equipment;
traffic processing means determination unit that determines the traffic processing means which will process the received communication traffic based on the traffic distribution rule; and
routing unit that routes the received communication traffic to the determined traffic processing means.

16. The apparatus of claim 8, wherein one or more of the plurality of asymmetrically configured blades comprise a varying number of applications.

* * * * *